United States Patent [19]

Koenig et al.

[11] 4,339,890
[45] Jul. 20, 1982

[54] DRY SEEDING MULCH AND PROCESS OF MAKING SAME

[75] Inventors: Bruce E. Koenig, 2499 Jolly Rd., Okemos, Mich. 48864; Thomas E. Niswander, 139 Woodmere St., Apt. 13, East Lansing, Mich. 48823

[73] Assignees: Bruce E. Koenig, East Lansing, Mich.; Thomas E. Niswander, Shaker Heights, Ohio ; a part interest

[21] Appl. No.: 170,077

[22] Filed: Jul. 18, 1980

[51] Int. Cl.³ ............................................. A01G 7/00
[52] U.S. Cl. ......................................................... 47/9
[58] Field of Search .................................. 47/9; 111/1

[56] References Cited

U.S. PATENT DOCUMENTS

| | | | |
|---|---|---|---|
| 3,218,149 | 11/1965 | Sproull et al. | 47/9 X |
| 4,067,140 | 1/1978 | Thomas | 47/9 |
| 4,232,480 | 11/1980 | Videen | 47/9 |

*Primary Examiner*—Robert E. Bagwill
*Attorney, Agent, or Firm*—Miller, Morriss & Pappas

[57] ABSTRACT

A dry seeding mulch having finely shredded or ground particles of waste paper mixed with a dry powdered chemical wetting agent and injected, after bagging, with a concentrated dye mixture which imparts color to the entire bag of mulch when mixed with water by the ultimate user. The mulch is produced by grinding or shredding waste paper into finely divided particles and mixing the finely divided particles of waste paper with a dry chemical wetting agent in the form of a powder. The dry mixture of paper particles and powdered chemical wetting agent is bagged for shipment and then injected with a concentrated chemical dye which produces only localized coloring at the point of injection. The entire contents of bag are colored by the dye when the ultimate user to whom the bag has been shipped mixes the dry mulch with water.

1 Claim, 2 Drawing Figures

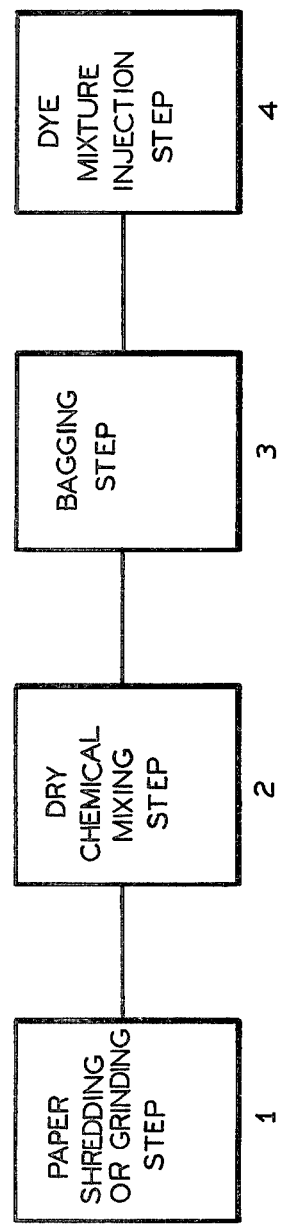
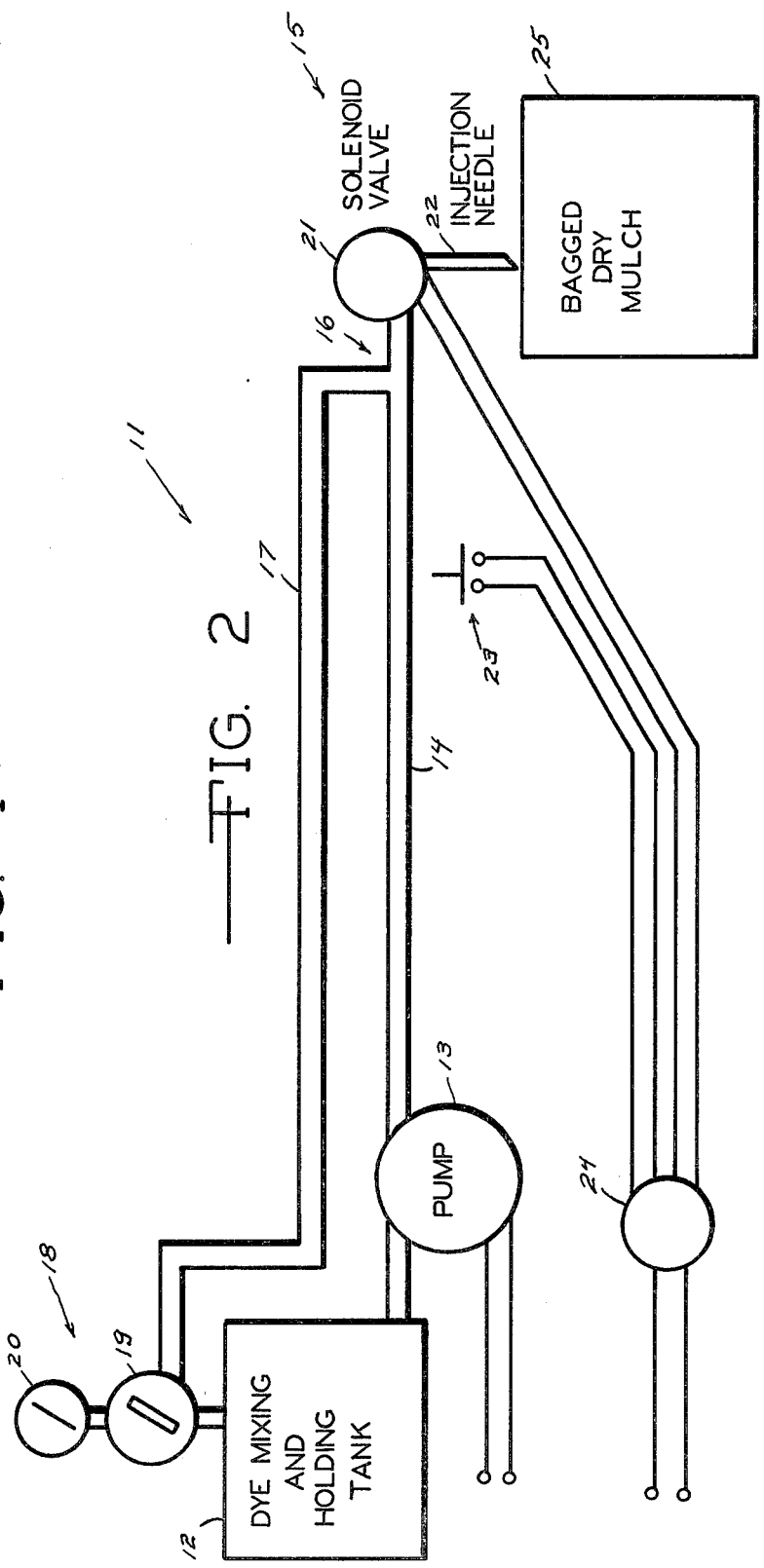

DRY SEEDING MULCH AND PROCESS OF MAKING SAME

The invention relates to a dry seeding mulch and more particularly to a mulch and process for making same which can be manufactured, bagged and shipped dry so as to significantly reduce shipping costs.

This invention further relates to a dry seeding mulch and process for making same wherein waste paper is shredded or ground into finely divided particles and mixed with a dry chemical wetting agent in powdered form. The resulting mixture is bagged for shipment. After the dry mulch mixture has been bagged, a concentrated green chemical coloring dye is injected through the wall of the bag into the dry mulch contained therein. The concentrated dye dries into crystals in a localized area of the mulch. The bagged mulch is then shipped to an ultimate user who admixes water with the dry mixture to form a sprayable slurry. The addition of water to the dry mulch mixture to form a sprayable slurry not only dissolves the powdered wetting agent but also dissolves the dry dye crystals with resultant coloring of the mulch.

The mulch products of the prior known art generally are produced by a process wherein the particles of waste paper are coated by use of a liquid mixture of wetting agent and dye. The resultant mulch is then shipped in a damp state to the ultimate user. The damp mulch is heavy and hence higher shipping costs are incurred which results in high costs to the ultimate user.

An object of this invention is to provide a dry seeding mulch and process for making the same which does not require the use of a liquid solvent such as water during the manufacture thereof.

Another object of this invention is to provide a dry seeding mulch and process for making same which does not increase in weight during the manufacturing thereof and hence, there is a resultant decrease in shipping costs.

Yet another object of this invention is to provide an apparatus and process whereby a concentrated chemical dye is injected into the bagged dry seeding mulch prior to shipment to the ultimate user.

A still further object of this invention is to provide an apparatus and process whereby a dry seeding mulch having a concentrated dye coloring injected thereinto is produced for shipment to the ultimate user who adds a liquid solvent such as water thereto.

Other objects and advantages found in the construction of the invention will be apparent from a consideration of the following specification in connection with the appended claims and the accompanying drawings.

IN THE DRAWINGS

FIG. 1 is a schematic flow diagram illustrating the process steps for producing the dry seeding mulch.

FIG. 2 is a schematic diagram illustrating the dye mixing and injecting apparatus.

SPECIFIC DESCRIPTION

As set forth in FIG. 1, the first step in the preparation of the dry seeding mulch invention consists of shredding, grinding, or otherwise reducing waste paper products such as newsprint, cardboard, magazines or other waste paper materials, into finely divided particles by use of shredder and/or grinder structures that are well known in the art and which will not be described here. For instance, the shredding step can be accomplished by use of a preshredder, a primary hammermill and/or a secondary hammermill. Any other combination of paper shredder equipment known in the prior art could also be used. It is also within the scope of the invention to utilize a tub grinder for this purpose. The grinding or shredding could be accomplished in one or more stages or steps rather than in the three stages utilizing the foregoing equipment.

After the waste paper has been ground or shredded into the desired particle size, it is then mixed with a dry chemical surfactant or wetting agent which is in a free flowing powder or small particle form. Any suitable manual or automatic mixing apparatus can be utilized to accomplish the mixing of the paper particles and dry surfactant powder. Thus mixed, the powdered surfactant adheres to the paper particles and is evenly distributed throughout the mass thereof.

It is within the scope of the invention to add the dry powdered chemical surfactant or wetting agent to the waste paper before, during or after the shredding thereof as desired as long as the dry surfactant powder is evenly mixed with the shredded particles.

The dry chemical wetting agent or surfactant has the characteristics of being in solid form, inert with respect to seed germination, non-toxic and low foaming when ultimately mixed with water by the ultimate user. A separate foam inhibitor could be added to the dry chemical wetting agent or surfactant if desired. Any type of inert filler may be utilized in order to obtain adequate volume for feeding. The dry chemical surfactant mixture utilized in the preferred embodiment consists of 1 part of any antifoam surfactant known in the art and 10 parts of ground calcium carbonate which acts merely as a carrier.

After the dry chemical surfactant mixture has been prepared, it can be metered into the entrance of the final grinding stage by a standard chemical feeding structure for mixing with the paper particles. If desired, the dry chemical surfactant mixture can be added to the waste paper at any desired point, i.e., before the first grinding or shredding stage or just before the bagging step.

In the preferred embodiment of the invention, the dry chemical surfactant mixture is added to the shredded paper at a ratio of 2.8 lbs of dry chemical surfactant mixture per 100 lbs of dry shredded paper. However, it is within the scope of the invention to use any other desired proportion so as to meet the requirements of any particular use application.

After the waste paper has been completely ground and/or shredded to the desired particle size and the dry chemical surfactant mixture has been mixed therewith, the resultant mixture is then loaded into separate bags for shipment to the consumer or ultimate user. The loading into bags can be accomplished manually or by automatic conveyor and loading machines that are well known in the art.

As shown in FIG. 2, a dye mixing, holding and injection assembly 11 is provided for mixing a concentrated dye, holding or storing it and subsequently injecting it into the bagged dry seeding mulch through the wall of the flexible container or bag.

A dye mixing and holding tank 12 is provided for preparing and maintaining an adequate supply of dye for selective injection into the bags containing the dry seeding mulch. The holding tank 12 is generally located in an area heated to 50° Fahrenheit or more to prevent crystallization of the dye.

A positive displacement pump 13 is provided in association with a pressure supply line 14 for selective delivery of dye to a dye injection gun assembly 15.

A T-connector 16 is provided in the pressure suppy line 14 proximate to and just ahead of the injection gun assembly 15. One side of the T-connector 16 is connected to a return hose line 17 which returns the dye to the holding tank 12. The dye is thus continuously circulated through the supply and return lines when not diverted to the injection gun assembly 15. Due to the continuous circulation of the dye, it is possible to use the injection gun in environments that are substantially below freezing without crystallization occurring. The return line 17 has a pressure regulator assembly 18 at the tank end thereof. The pressure regulator assembly 18 consists of an adjustable pressure regulator 19 and a pressure guage 20. The discharge side of the pressure regulator 19 returns the dye to the holding tank 12. The pressure regulator 19 may be adjusted to maintain a level of pressure in the line that will result in the desired amount of dye passing through the injection gun assembly 15.

The other side of the T-connector 16 supplies the injection gun assembly 15 with dye at the desired regulated pressure. The injection gun assembly 15 consists of an electrically operated solenoid valve 21 with a hollow needle 22 attached to the outlet side thereof. A momentary contact push button switch 23 is also provided in association with the injection gun assembly 15. The switch 23 is wired to activate an interval-on timing relay 24 which in turn activates the solenoid valve 21. When it is desired to add dye to the dry seeding mulch, the needle 22 is inserted through the wall of the bag 25 into contact with the mulch contained therein.

When the button switch 23 is pushed and held on, the adjustable interval relay 24 opens the solenoid valve 21 for a period of several seconds allowing dye to flow through the needle 22 and into the bag 25 containing the dry seeding mulch that is being injected. The solenoid valve 21 then closes when the electrical signal from the interval relay 24 stops. The length of the interval can be adjusted to result in the required amount of dye being injected into the dry seeding mulch in bag 25. The needle 22 is then removed from the bag and the bag is ready for shipment. The dye, thus injected into the bag, dries and crystallizes in a localized portion of the dry seeding mulch. When water is added by the ultimate user to form a sprayable slurry, the dye is diffused through the entire amount of dry seeding mulch contained in the bag. It is within the scope of the invention to add concentrated dye in the form of dry capsules or crystals to the dry seeding mulch contained in the bag rather than by adding it thereto by way of the injection process described above. It is also within the scope of the invention to utilize other means to deliver dye under pressure to the injection gun or needle assembly.

Any desired dye known in the art can be utilized so long as it is water soluble and is biologically inert. It is within the scope of the invention to utilize a coal tar dye. Although a green dye is generally used, it is within the scope of the invention to utilize any other color as desired. In some applications such as in the reclaiming of strip mines or other revegetation projects, the only color needed is to provide a differentiating indicator to show where spraying has already occurred.

It is thus seen that a dry seeding mulch and method and apparatus for producing the same are provided which results in savings due to lowered manufacturing and shipping costs. The elimination of the use of a water solvent in the manufacturing thereof results in a dry seeding mulch that is lighter in weight than the mulch products presently in use, hence significantly lower shipping and handling costs result.

In summary, a process or method for producing a dry seeding mulch is provided which consists of the steps of (a) reducing dry waste paper products into finely divided particles, (b) mixing the finely divided particles of dry waste paper products with a dry chemical wetting agent in powder form so as to provide a dry seeding mulch mixture, (c) placing the dry seeding mulch mixture into shipping bags, and (d) introducing a concentrated coloring dye into the bagged dry seeding mulch mixture. In one embodiment of the invention, the concentrated coloring dye is introduced into the bagged dry seeding mulch mixture in liquid form by injection through the wall of the bag. In another embodiment of the invention, the concentrated coloring dye is introduced into the bagged dry seeding mulch mixture in the form of dry crystals or capsules.

The apparatus utilized for injecting the coloring dye into a bagged dry seeding mulch mixture consists of a dye mixing and holding tank which is provided with an adjustable pressure regulator. A dye injection needle or gun assembly is provided which is adapted for injection of a liquid dye through the wall of a shipping bag into dry seeding mulch contained therein. The dye injection needle assembly is provided with a solenoid control valve and control means for selective actuation thereof. Dye delivery means are provided for connecting the dye mixing and holding tank and the dye injection needle assembly so as to selectively deliver dye to the dye injection needle assembly on demand. The dye delivery means are provided with a dye delivery pump in association therewith. Electrical control means are provided in association with said dye injection needle assembly and said dye delivery means so as to provide for selective actuation thereof.

Various other modifications of the invention may be made without departing from the principle thereof. Each of the modifications is to be considered as included in the hereinafter appended claims, unless these claims by their language expressly provide otherwise.

We claim:

1. In a process for producing a dry seeding mulch, the steps which include:

(a) reducing dry waste paper products into fine divided particles;
(b) mixing said finely divided particles of dry waste paper products with a dry chemical wetting agent in powder form so as to provide a dry seeding mulch mixture;
(c) placing said dry seeding mulch mixture into shipping bags;
(d) preparing said bags for shipment; and
(e) injecting a viscous liquid coloring dye into said bagged dry seeding mulch mixture.

* * * * *